(12) United States Patent
Smith et al.

(10) Patent No.: US 7,072,448 B2
(45) Date of Patent: Jul. 4, 2006

(54) DSL TESTER

(75) Inventors: Donald Scott Smith, Vinemont, AL (US); Steven Ryals, Pinson, AL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 65 days.

(21) Appl. No.: 10/868,021

(22) Filed: Jun. 15, 2004

(65) Prior Publication Data

US 2005/0276398 A1    Dec. 15, 2005

(51) Int. Cl.
*H04M 1/24* (2006.01)
(52) U.S. Cl. ............... 379/1.03; 379/21; 379/27.01
(58) Field of Classification Search ........... 379/399.01, 379/93.01, 21, 28, 27.01, 27.08, 32.04
See application file for complete search history.

(56) References Cited

U.S. PATENT DOCUMENTS

| | | | |
|---|---|---|---|
| 3,729,597 A * | 4/1973 | Garrett et al. ................ 379/21 |
| 5,757,803 A * | 5/1998 | Russell et al. ............... 370/494 |
| 6,173,040 B1 * | 1/2001 | Wang ........................ 379/377 |
| 6,301,337 B1 * | 10/2001 | Scholtz et al. ........... 379/93.06 |
| 6,763,087 B1 * | 7/2004 | Chen et al. .................... 379/21 |

OTHER PUBLICATIONS

ADSL Technology, Overview, line qualification and service turn-up, Apr. 2002, available at http://www.actema.com/.
Bohn, Dennis A., Interfacing Audio and POTS, 2002, available at http://www.rane.com/note150.html.
Digital Loop Carrier Tutorial, available on Oct. 12, 2004 at http://www.tele.sunvit.edu/DLC_page1.htm.
Harris ADSL/POTS Splitter, available on Oct. 12, 2004 at http://www.aegis.net.au/ADSL_Pot_&_Spliter-Aegis.pdf.
mPhase Technologies, Customer Premises POTS Splitters and Filters, available on Oct. 12, 2004 at http://www.mphasetech.com/.
Pulse, Inductors and Common Mode Chokes For Use in ADSL POTS Low Pass Filters, available on Oct. 12, 2004 at http://www.pulseeng.com/.
Technical Seminars, xDSL (Digital Subscriber Loop), available on Oct. 12, 2004 at http://www.nextgendc.com/seminar_xdsl.htm.

* cited by examiner

*Primary Examiner*—Daniel Swerdlow
(74) *Attorney, Agent, or Firm*—Myers Bigel Sibley & Sajovec

(57) ABSTRACT

A device for detecting a transmission of at least one of a first communication signal and a second communication signal in a communication network is disclosed. The first communication signal is transmitted within a first frequency band, and the second communication signal is transmitted within a second frequency band. The device includes a housing and a filter circuit in the housing. The filter circuit is adapted to communicatively interface with the communication network and includes a first circuit path for passing the first communication signal, wherein the first circuit path includes a first indicator for providing a first indication of the passed first communication signal. The filter circuit further includes a second circuit path for passing the second communication signal, wherein the second circuit path includes a second indicator for providing a second indication of the passed second communication signal.

10 Claims, 4 Drawing Sheets

DSL TESTER

TECHNICAL FIELD

The present invention is directed generally and in various embodiments to devices for detecting communication signals in a communication network.

BACKGROUND

Digital subscriber line (xDSL) technologies for providing high-speed data communication services using conventional public switched telephone networks (PSTNs) are well known in the telecommunications field and are becoming increasingly popular as bandwidth needs of personal and business communications continue to grow. A telecommunications service provider (TSP) may implement one or more established xDSL communication standards such as, for example, ADSL (asynchronous digital subscriber line), HDSL (high bit-rate digital subscriber line), and VDSL (very high bit-rate digital subscriber line) based on factors such as the bandwidth of the upstream/downstream communication channels and the distance over which communications are to be transmitted.

Integration of an xDSL data service into a conventional PSTN infrastructure has historically required the application of complex diagnostic and testing techniques. This is particularly true for a data service based on the ADSL communication standard, which enables analog voice and data communications to be transmitted simultaneously over a single unshielded twisted pair (UTP). In addition, the need to enhance the capabilities of portable test equipment has increased. For example, microprocessor-based test sets, such as, for example, the SunSet xDSL test set available from Sunrise Telecom, Inc. of San Jose, Calif., are widely used for performing tasks specific to xDSL communication services. Such tasks may include, for example, installation and provisioning tasks, diagnostic tasks, and loop pre-qualification tasks. In addition to these and other xDSL capabilities, such test sets may also be capable of performing tasks specific to conventional PSTN services, along with general diagnostic tasks (e.g., capacitance, resistance, AC/DC voltage, and frequency measurements). The various electronic components necessary to support these capabilities, however, increase the size and weight of the test equipment. Additionally, the complexity of such devices may substantially increase equipment cost and failure rates, as well as the amount of training required for its proper use.

Although test sets with comprehensive testing capabilities such as those described above may be useful for certain tasks, other tasks may not warrant their use. For example, some tasks may simply require a determination of what signals (e.g., analog voice, data), if any, are present on a UTP associated with an ADSL service. For such tasks, the use of complex test equipment may not be desirable or justified in view of the weight, size, and cost of such complex equipment.

SUMMARY

In one general respect, this application discloses devices for detecting a transmission of at least one of a first communication signal and a second communication signal in a communication network, wherein the first and second communication signals are transmitted within first and second frequency bands, respectively. According to various embodiments, the devices include a housing and a filter circuit contained in the housing. The filter circuit is adapted to communicatively interface with the communication network and includes a first circuit path for passing the first communication signal and a second circuit path for passing the second communication signal. The first circuit path includes a first indicator for providing a first indication of the passed first communication signal, and the second circuit path includes a second indicator for providing a second indication of the passed second communication signal.

In another general respect, this application discloses methods for detecting a transmission of at least one of a first communication signal and a second communication signal in a communication network. According to various embodiments, the method includes communicatively interfacing with the communication network, receiving the at least one of a first communication signal and the second communication signal from the communications network, passing the first communication signal through a first circuit path based on a first predetermined frequency band of the first communication signal, passing the second communication signal through a second circuit path based on a second predetermined frequency band of the second communication signal, providing a first indication in response to the first communication signal passing through the first circuit path, and providing a second indication in response to the second communication signal passing through the second circuit path.

Other devices and/or methods according to embodiments will be or become apparent to one with skill in the art upon review of the following drawings and detailed description. It is intended that all such devices and/or methods be included within this description, be within the scope of the present invention, and be protected by the accompanying claims.

BRIEF DESCRIPTION OF THE FIGURES

The present disclosure will be described in conjunction with the following figures, wherein.

DETAILED DESCRIPTION

Figure 1:
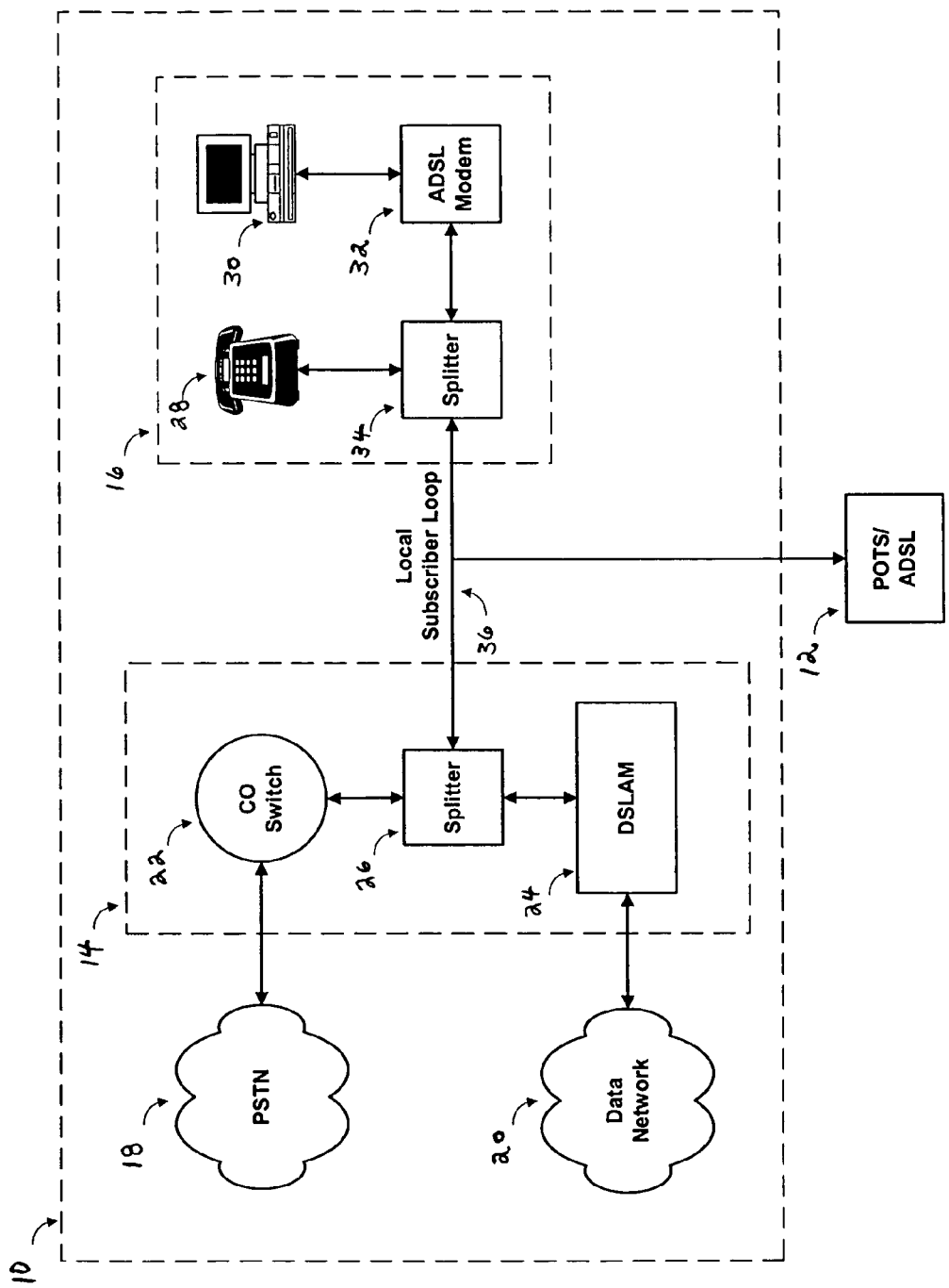
FIG. 1 illustrates a communication network according to various embodiments in which a device of the present invention is used to detect at least one of a first communication signal and a second communication signal transmitted within the communication network.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity.

FIG. 1 illustrates a communication network 10 according to various embodiments in which a device 12 of the present invention is used to detect at least one of a first communication signal and a second communication signal transmitted within the communication network 10. According to various embodiments, the communication network 10 includes conventional PSTN infrastructure that has been upgraded to provide analog voice and high-speed data services simultaneously using the ADSL communication standard. In such embodiments, the first communication signal is a plain old telephone service (POTS) communication signal associated with a analog voice service, and the second communication signal is an ADSL communication signal associated with a high-speed data service. The data contained in the ADSL communication signal may be voice or non-voice data.

As shown in FIG. 1, the communication network 10 includes a local office 14 containing communication equipment associated with analog voice and high-speed data services, a subscriber premises 16 containing terminating equipment and other hardware associated with a subscriber to analog voice and high-speed data services, a PSTN 18, and a data network 20. Communication equipment contained in the local office 14 may include, for example, a central office (CO) switch 22 in communication with the PSTN 18, a DSL access multiplexer (DSLAM) 24 in communication with the data network 20, and a splitter 26 in communication with the CO switch 22 and the DSLAM 24. Terminating equipment contained in the subscriber premises 16 may include, for example, a telephone 28, a personal computer 30, an ADSL modem 32 in communication with the computer 30, and a splitter 34 in communication with the telephone 28 and the ADSL modem 32. Plain old telephone service (POTS) and ADSL communication signals are exchanged between the local office 14 and the subscriber premises 16 via a local subscriber loop 36 having one end that terminates at splitter 26 and another end that terminates at splitter 34. According to various embodiments, the local subscriber loop 36 is an unshielded twisted pair (UTP) or equivalent two-conductor communication link.

Although not shown for the purpose of clarity, the communication network 10 typically includes additional subscriber premises, each having a corresponding local subscriber loop, terminating splitters, and various types of terminating equipment associated therewith. Accordingly, the CO switch 22 and the DSLAM 24 of the local office 14 are typically configured to communicate with a number of local subscriber loops and corresponding splitters in addition to those depicted in FIG. 1. Thus, although the discussion below generally focuses on analog voice and data communications transmitted to and from a single subscriber premises 16, one skilled in the art will recognize that other such communications may be concurrently transmitted to and from additional subscriber premises.

The CO switch 22 may be any of a variety of circuit-based switching elements well-known in the telecommunication field for routing POTS-based communications between the PSTN 18 and POTS-compatible terminating equipment of the subscriber premises 16, such as the telephone 28. The PSTN 18 typically includes a plurality of interconnected central offices (not shown) similar to the local office 14 of FIG. 1 and supports a variety of conventional and enhanced analog voice services.

The DSLAM 24 implements the ADSL communication standard for enabling high-speed data transmission between the data network 20 and ADSL-compatible terminating equipment of the subscriber premises 16, such as the ADSL modem 32 and associated computer 30. According to various embodiments, the data network 20 is the Internet. An incoming data transmission received by the DSLAM 24 from the data network 20 includes a data stream to be transmitted to terminating equipment 30, 32 of the subscriber premises 16 (i.e, "downstream" data). Additionally, the incoming data transmission may also include data streams to be transmitted to terminating equipment associated with other subscriber premises. Based upon the intended recipients of the various data streams comprising the incoming data transmission, the DSLAM 24 de-multiplexes the incoming data transmission into its constituent data streams. The DSLAM 24 then routes the data stream intended for receipt by the terminating equipment 30, 32 via the local subscriber loop 36 and terminating splitters 26, 34. Conversely, a data stream transmitted to the DSLAM 24 from the terminating equipment 30, 32 (i.e., "upstream" data) is multiplexed with data streams received from terminating equipment associated with other subscriber premises to form a single outgoing data transmission which is transmitted by the DSLAM 24 to the data network 20.

Simultaneous transmission of POTS and ADSL communication signals via the local subscriber loop 36 is accomplished by allocating a pre-determined portion of the bandwidth available on the local subscriber loop 36 to each of the first and second communication signals. For example, the ADSL communication standard implemented by the DSLAM 24 may utilize discrete multi-tone (DMT) modulation to subdivide the available bandwidth into 256 4.3 kHz channels (channels 0–255), thus providing a total bandwidth of approximately 1.1 Mhz. POTS communication signals, typically occupying a frequency range of 0.3 to 4 kHz, are communicated using channel 0 (0–4.3 kHz). ADSL data streams originating at the terminating equipment 30, 32 of the subscriber premises 16 (upstream data) are transmitted using channels 6–31 (25.8–138 KHz), and ADSL data transmissions originating at the DSLAM 24 of the local office 14 (downstream data) are transmitted using channels 33–255 (142.3–1104 KHz). The unused channels separating the POTS channel from the data channels serve to lessen the likelihood of interference.

The splitter 26 terminating the local subscriber loop 36 at the local office 14 splits POTS and ADSL communication signals received from the subscriber premises 16 based on their respective frequencies bands. The split POTS communication signals are transmitted to the CO switch 22 and the split ADSL communication signals are transmitted to the DSLAM 24. The splitter 26 is typically one of a plurality of identical splitters comprising an ADSL splitter shelf unit that terminates a plurality of local subscriber loops identical to local subscriber loop 36.

Similarly, the splitter 34 terminating the local subscriber loop 36 at the subscriber premises 16 also splits POTS and ADSL communication signals received from the local office 14 based on their respective frequency bands. The split POTS communication signals are transmitted to the telephone 28 and the split ADSL communication signals are transmitted to the ADSL modem 32 for conversion into data signals compatible with the computer 30. It should be noted that the ADSL modem 32 may include an integral splitter (not shown) for splitting the ADSL and the POTS communication signals. Accordingly, the splitter 34 may have only the telephone 28 connected thereto, and the local communication loop 36 connect directly to the ADSL modem 32.

Figure 2:
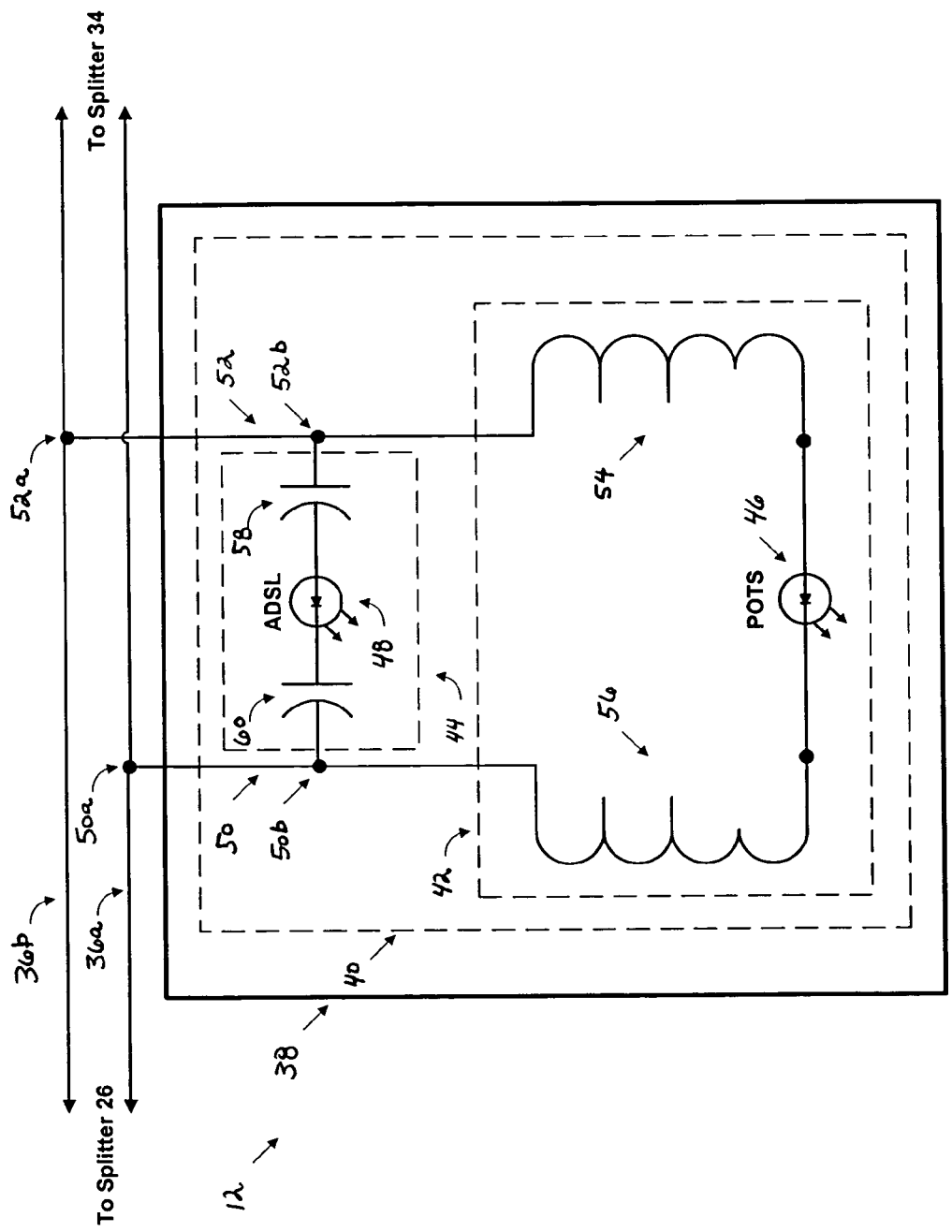
FIG. 2 illustrates various embodiments of the device of FIG. 1.

FIG. 2 illustrates various embodiments of the device 12 of FIG. 1. The device 12 includes a housing 38 and a filter circuit 40 contained in the housing 38. The housing 38 may be constructed from a suitably durable plastic material such that the filter circuit 40 is sufficiently protected from moisture and inadvertent mechanical force. The filter circuit 40, according to various embodiments, is a passive filter circuit that includes passive electrical components, such as, for example, inductors and capacitors. As shown in FIG. 2, the filter circuit 40 includes a first circuit path 42 and a second circuit path 44, wherein the first and second circuit paths 42, 44 each include a first and a second indicator 46, 48, respectively.

According to various embodiments, the device 12 includes a first conductive lead 50 and a second conductive lead 52. Each conductive lead 50, 52 includes a first end 50a, 52a, respectively, having a first electrical engagement means connected thereto, wherein the first electrical engagement means permits the first end 50a, 52a of each conductive lead 50, 52 to communicatively interface with a corresponding conductor 36a, 36b of the local subscriber loop 36. Depending upon the location at which the conductors 36a, 36b of the local subscriber loop 36 are interfaced, the first electrical engagement means may be, for example and without limitation, alligator clips, hook clips, pincer clips, metallic contacts, a RJ–14 jack, or a RJ–45 jack. Each conductive lead 50, 52 also includes a second end 50b, 52b, respectively, having a second electrical engagement means connected thereto. The second electrical engagement means of each second end 50b, 52b may be removably insertable into a corresponding receptacle in the housing 38 such that each second end 50b, 52b communicatively interfaces with the filter circuit 40. The second electrical engagement means may be, for example, and without limitation, a banana plug. Alternatively, the second electrical engagement means may be such that the second ends 50b, 52b communicatively interface with the filter circuit 40 in an irremovable fashion. For example, the second electrical engagement means may be solder. When the second electrical engagement means are communicatively interfaced with the filter circuit 40, the electrical configuration of the conductive leads 50, 52 and the filter circuit 40 is such that the first and second circuit paths 42, 44 are in series with the conductive leads 50, 52, and the first and second circuit paths 42, 44 are in parallel with respect to each other.

According to various embodiments, the first circuit path 42 further includes a first inductor 54 and a second inductor 56 connected in series, with the first indicator 46 electrically connected therebetween. The second circuit path 44 further includes a first capacitor 58 and a second capacitor 60 connected in series, with the second indicator 48 electrically connected there between. According to various embodiments, the first and second indicators 46, 48 are LEDs, wherein each LED has a predetermined color associated therewith. In such embodiments, the addition of a current-limiting resistor (not shown) between the first indicator 46 and the second inductor 56 of the first circuit path 42 and between the second indicator 48 and the second capacitor 60 of the second circuit path 44 may be required. Alternatively, the first and second indicators 46, 48 may each include an integral current-limiting resistor. Furthermore, where the first and second indicators 46, 48 are LEDs, the LEDs may be mounted such that each slightly protrudes through a corresponding opening in the housing 38 to promote adequate visibility for a technician, for example. Inductance values for each inductor 54, 56 and capacitance values for each capacitor 58, 60 are such that that only the first communication signal is permitted to pass through the first circuit path 42 based on the first predetermined frequency band, and only the second communication signal is permitted to pass through the second circuit path 44 based on the second predetermined frequency band. As discussed above in connection with various embodiments of FIG. 1, the first communication signal is a POTS communication signal transmitted within a frequency band of 0–4.3 kHz, and the second communication signal is an ADSL communication signal transmitted within a frequency band of 25.8 to 1104 kHz.

Figure 3:
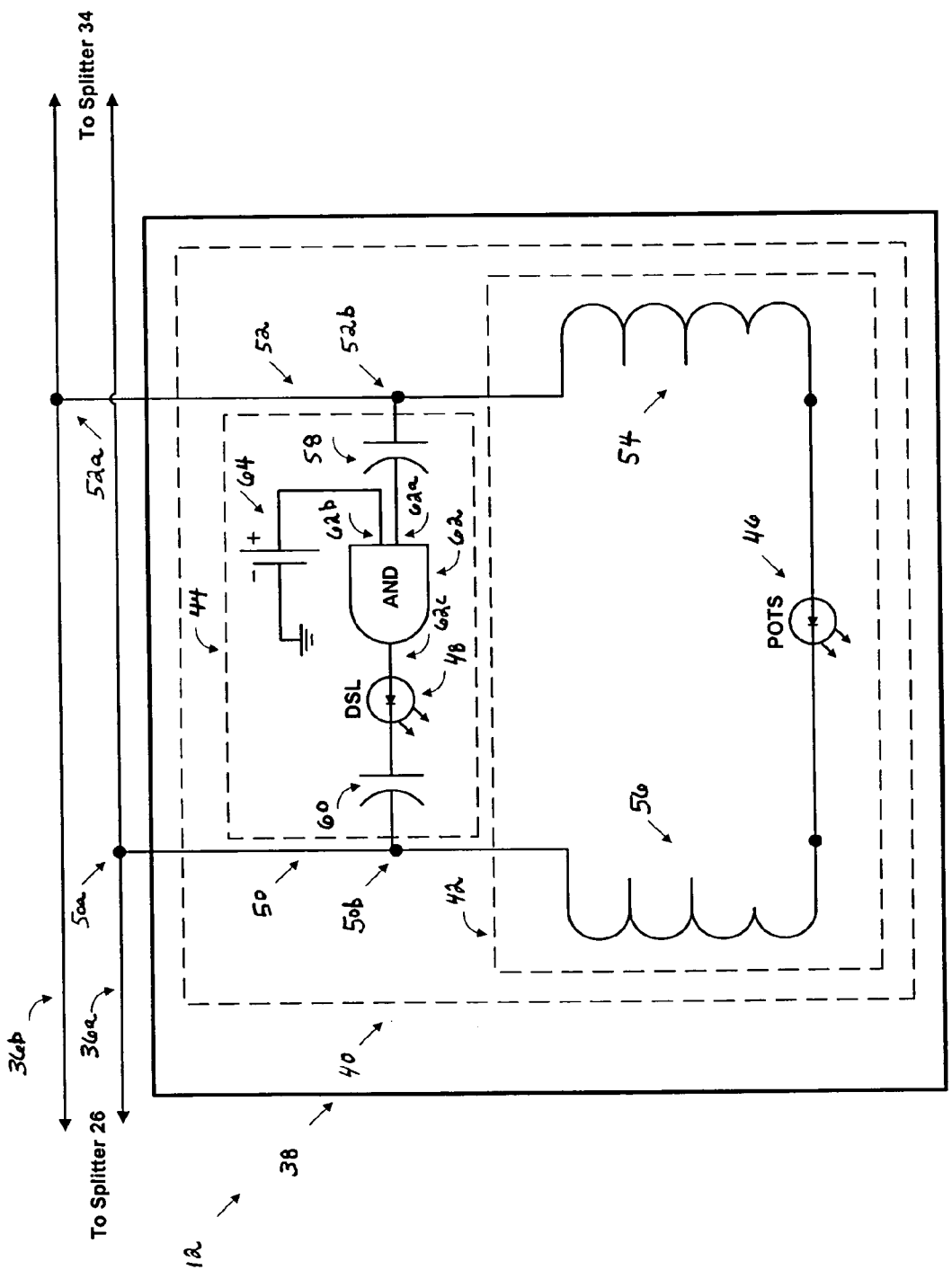
FIG. 3 illustrates various embodiments of the device of FIG. 1.

FIG. 3 illustrates various embodiments of the device of FIG. 1. As shown in FIG. 3, the device 12 is identical to that depicted in FIG. 2, except that the second circuit path 44 further includes a logical AND gate 62 electrically connected between and in series with the first capacitor 58 and the second indicator 48. According to various embodiments, the logical AND gate 62 includes a first input 62a connected to the first capacitor 58, a second input 62b connected to a DC voltage source 64 and receiving a DC voltage signal therefrom, and an output 62c connected to the second indicator 48. The DC voltage source 64 may include, for example, a voltage regulator powered by a 9 VDC battery for providing a 5 VDC signal to the second input 62b. The DC voltage source 64 may also supply operating voltage to appropriate inputs (not shown) of the logical AND gate 62. The DC voltage source 64 may further include a switch (not shown) that is externally accessible with respect to the housing 38 through a corresponding opening therein, wherein the switch is connected such that the operating voltage and the DC voltage signal may be removed from the inputs of the logical AND gate 62 when the device 12 is not in use.

The logical AND gate 62 operates such that when the DC voltage signal is applied to the second input 62b (i.e., the device 12 is switched on) and the second communication signal is received at the first input 62a via the first capacitor 58, the output 62c transitions to a "high" logic level voltage. The high logic level voltage may be approximately 5 VDC, for example, where the logical AND gate 62 is based upon TTL logic. The second indicator 48 is thus caused to produce a second indication in response to the high logic voltage level at the output 62c. Embodiments incorporating the logical AND gate 62 are preferable where the second communication signal has a high frequency such that the indicator 48 cannot be driven directly by the second communication signal.

Figure 4:
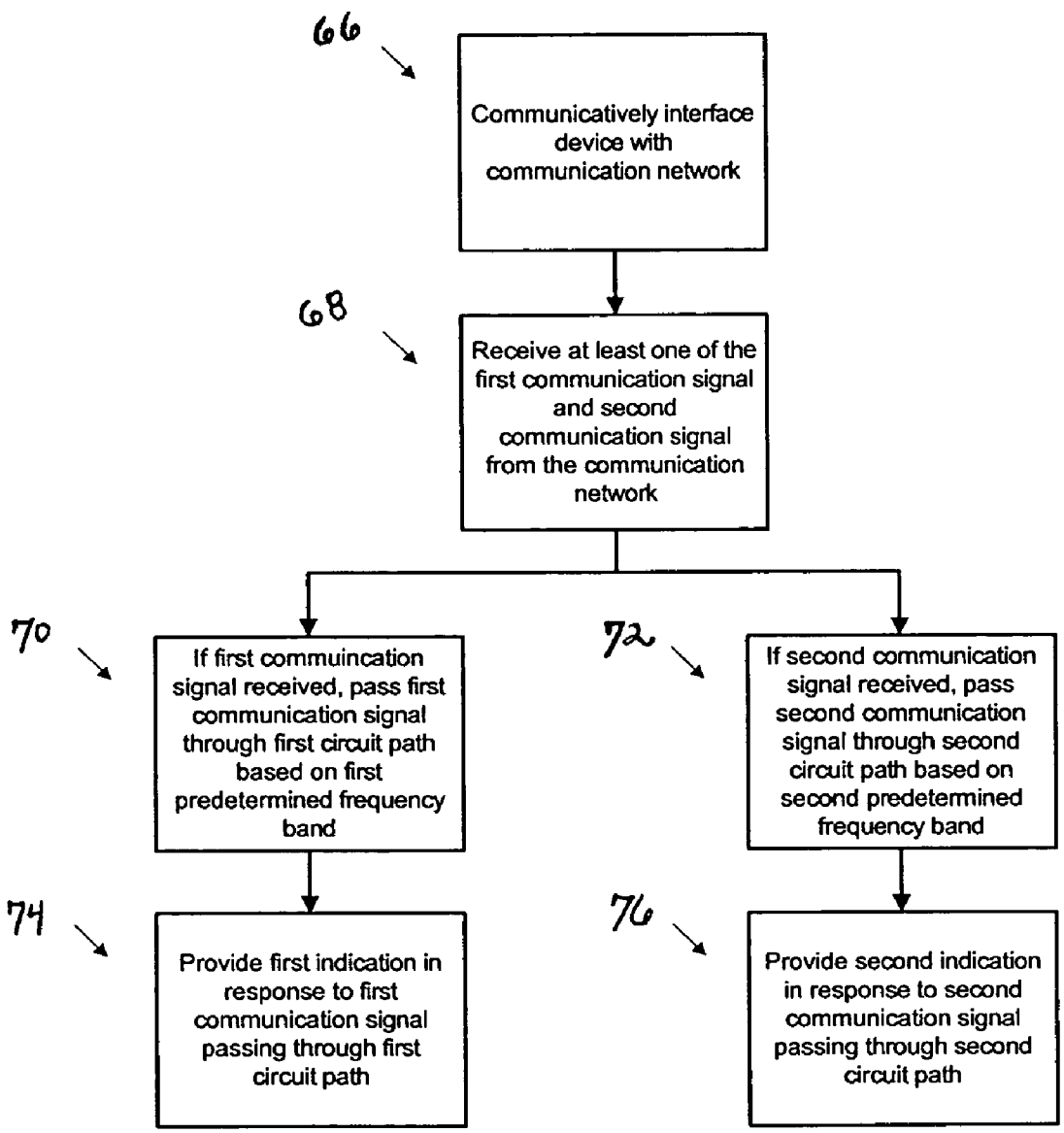
FIG. 4 illustrates various embodiments of the flow of the first and second communication signals passing through the devices of FIGS. 2 and 3.

FIG. 4 illustrates various embodiments of the flow of the first and second communication signals passing through the devices of FIGS. 2 and 3. At step 66, the device 12 is communicatively interfaced with the communication network 10 by connecting the first ends 50a, 52a of the conductive leads 50, 52 to a corresponding conductor 36a, 36b of the local subscriber loop 36 using the first electrical engagement means. As discussed above in connection with FIG. 1, the communication network 10, according to various embodiments, includes infrastructure of a conventional PSTN that has been upgraded to provide analog voice and high-speed data services simultaneously using the ADSL communication standard. Depending on the operational status of the communication network 10, one, both, or neither of the first and second communication signals may be present on the local subscriber loop 36.

At step 68, if the first communication signal is being transmitted on the local subscriber loop 36 while the device 12 is connected thereto, the filter circuit 40 receives the first communication signal via the conductive leads 50, 52. Similarly, if the second communication signal is being transmitted on the local subscriber loop 36 while the device 12 is connected thereto, the filter circuit 40 also receives the second communication signal.

At step 70, based on the frequency band of the first communication signal, the first communication signal is passed through the first circuit path 42, and thus through the first indicator 46. Similarly, at step 72, based on the frequency band of the second communication signal, the second communication signal is passed through the second circuit path 44, and thus through the second indicator 48. At steps 74 and 76, when the first and second communication signals pass through their respective circuit paths 42, 44, the indicators 46, 48 produce a corresponding indication in response.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. For example, the filter circuit may include an active filter circuit that includes one or more operational amplifiers. The preceding description, therefore, is not meant to limit the scope of the invention.

What is claimed is:

1. A device for detecting a transmission of a plain old telephone service (POTS) communication signal and/or a digital subscriber loop (DSL) communication signal in a communication network, wherein the communications network includes a publicly switched telephone network (PSTN) having one or more local subscriber loops associated therewith, wherein at least one of the local subscriber loops includes an unshielded twisted pair (UTP) for transmitting the POTS and DSL communication signals, the device comprising:

a housing; and
a filter circuit contained in the housing, wherein the filter circuit is adapted to communicatively interface with the communication network, and wherein the filter circuit includes:
  a first circuit path for passing the POTS communication signal, wherein the first circuit path includes a first indicator for providing a first indication of the passed POTS communication signal; and
  a second circuit path for passing the DSL communication signal, wherein the second circuit path includes a second indicator for providing a second indication of the passed DSL communication signal;
a first conductive lead and a second conductive lead, wherein each of the first and second leads includes:
  a first end having a first electrical engagement means connected thereto for communicatively interfacing with a first conductor contained in the UTP; and
  a second end having a second electrical engagement means connected thereto for communicatively interfacing with the filter circuit;
wherein the first circuit path further includes a first inductor and a second inductor, wherein the first indicator is electrically connected between the first and second inductors, and wherein the first circuit path is in series with first and second conductive leads when each second electrical engagement means electrically engages the filter circuit;
wherein the second circuit path further includes a first capacitor and a second capacitor, wherein the second indicator is electrically connected between the first and second capacitors, and wherein the second circuit path is in series with first and second conductive leads when each second electrical engagement means electrically engages the filter circuit;
wherein inductance values for each of the first and second inductors and capacitance values for each of the first and second capacitors are such that only the POTS communication signal is permitted to pass through the first circuit path and only the DSL communication signal is permitted to pass through the second circuit path; and
wherein the second circuit path further includes a logical AND gate, wherein the logical AND gate includes a first logic input, a second logic input, and an output; wherein the logical AND gate is electrically connected between the first capacitor and the second indicator such that the first logic input is connected to the first capacitor, the second logic input is connected to a DC voltage source, and the output is connected to the second indicator.

2. The device of claim 1 wherein the DSL communication signal is associated with a data service, wherein the data service is associated with a data network.

3. The device of claim 2, wherein the data network is the Internet.

4. The device of claim 1, wherein the DSL communication signal is an ADSL communication signal.

5. The device of claim 1, wherein the first indicator is an LED having a first predetermined color associated therewith and the second indicator is an LED having a second predetermined color associated therewith, and wherein the first and second indications are visual indications generated by the first and second LEDs respectively when the POTS and DSL communication signals pass through the first and second circuit paths respectively.

6. A device for detecting a transmission of a plain old telephone service (POTS) communication signal and a digital subscriber loop (DSL) communication signal in a communication network, the device comprising:

a housing; and
a filter circuit contained in the housing, wherein the filter circuit is adapted to communicatively interface with the communication network, wherein the filter circuit includes a first LED that is activated to provide a first indication in response to a passed POTS communication signal, and a second LED that is activated to provide a second indication in response to passed DSL communication signal, and wherein the filter circuit is a passive filter circuit including an LC filter circuit, the passive filter circuit comprising:
  a first circuit oath that includes a first inductor and a second inductor, wherein the LED indicator is electrically connected between the first and second inductors, and wherein the first circuit path is in series with first and second conductive leads when each second electrical engagement means electrically engages the filter circuit; and
  a second circuit path that includes a first capacitor and a second capacitor, wherein the second LED is electrically connected between the first and second capacitors, and wherein the second circuit path is in series with first and second conductive leads when each second electrical engagement means electrically engages the filter circuit;
wherein inductance values for each of the first and second inductors and capacitance values for each of the first and second capacitors are such that only the POTS communication signal is permitted to pass through the first circuit path and only the DSL communication signal is permitted to pass through the second circuit path; and
wherein the second circuit path further includes a logical AND gate, wherein the logical AND gate includes a first logic input, a second logic input, and an output;

wherein the logical AND gate is electrically connected between the first capacitor and the second LED such that the first logic input is connected to the first capacitor, the second logic input is connected to a DC voltage source, and the output is connected to the second LED.

7. The device of claim 6 wherein the first LED has a first color associated therewith and wherein the second LED has a second color associated therewith.

8. The device of claim 6, wherein the communications network includes a publicly switched telephone network (PSTN) having one or more local subscriber loops associated therewith, wherein at least one of the local subscriber loops includes an unshielded twisted pair (UTP) for transmitting the POTS and DSL communication signals.

9. The device of claim 8, further comprising a first conductive lead and a second conductive lead, wherein each of the first and second leads includes:

a first end having a first electrical engagement means connected thereto for communicatively interfacing with a first conductor contained in the UTP; and a second end having a second electrical engagement means connected thereto for communicatively interfacing with the filter circuit.

10. The device of claim 6, wherein the DSL communication signal is an ADSL communication signal.

* * * * *

UNITED STATES PATENT AND TRADEMARK OFFICE
CERTIFICATE OF CORRECTION

| | |
|---|---|
| PATENT NO. | : 7,072,448 B2 |
| APPLICATION NO. | : 10/868021 |
| DATED | : July 4, 2006 |
| INVENTOR(S) | : Donald Scott Smith and Steven Ryals |

It is certified that error appears in the above-identified patent and that said Letters Patent is hereby corrected as shown below:

<u>Column 8</u>

Line 44, "oath" should be --path--.

Signed and Sealed this

Twelfth Day of December, 2006

JON W. DUDAS
*Director of the United States Patent and Trademark Office*